US012608145B2

(12) United States Patent (10) Patent No.: US 12,608,145 B2
Yamauchi et al. (45) Date of Patent: Apr. 21, 2026

(54) COMPUTER SYSTEM AND STORAGE MANAGEMENT METHOD FOR ALLOCATING STORAGE AREAS TO CONTAINERS BASED ON STORAGE CHARACTERISTICS AND CONNECTION INFORMATION IN A MULTI-BASE CLOUD ENVIRONMENT

(71) Applicant: Hitachi Vantara, Ltd., Kanagawa-ken (JP)

(72) Inventors: Yugo Yamauchi, Tokyo (JP); Mitsuo Hayasaka, Tokyo (JP)

(73) Assignee: Hitachi Vantara, Ltd., Kanagawa (JP)

( * ) Notice: Subject to any disclaimer, the term of this patent is extended or adjusted under 35 U.S.C. 154(b) by 0 days.

(21) Appl. No.: 18/830,162

(22) Filed: Sep. 10, 2024

(65) Prior Publication Data

US 2025/0328268 A1 Oct. 23, 2025

(30) Foreign Application Priority Data

Apr. 17, 2024 (JP) ................................ 2024-067053

(51) Int. Cl.
*G06F 3/06* (2006.01)

(52) U.S. Cl.
CPC .......... *G06F 3/0631* (2013.01); *G06F 3/0604* (2013.01); *G06F 3/0647* (2013.01); *G06F 3/067* (2013.01)

(58) Field of Classification Search
CPC .... G06F 3/0631; G06F 3/0604; G06F 3/0647; G06F 3/067
See application file for complete search history.

(56) References Cited

U.S. PATENT DOCUMENTS

| | | | |
|---|---|---|---|
| 10,579,403 B2 | 3/2020 | Antony et al. | |
| 2018/0181313 A1* | 6/2018 | Nakata | G06F 3/0607 |
| 2018/0307537 A1* | 10/2018 | Chen | G06F 16/128 |
| 2019/0361618 A1* | 11/2019 | Avraham | G06F 3/0631 |
| 2020/0042214 A1* | 2/2020 | Chen | G06F 3/0632 |
| 2020/0192693 A1* | 6/2020 | Kawase | G06F 9/45558 |
| 2020/0225981 A1* | 7/2020 | Takahashi | G06F 9/4856 |
| 2020/0401452 A1* | 12/2020 | Piercey | G06F 9/5016 |
| 2021/0034423 A1* | 2/2021 | Hallur | G06F 9/45558 |
| 2021/0240369 A1* | 8/2021 | Cain | G06F 3/0679 |
| 2022/0229605 A1* | 7/2022 | Degwekar | G06F 3/0604 |

(Continued)

*Primary Examiner* — Ryan Bertram

(74) *Attorney, Agent, or Firm* — Procopio, Cory, Hargreaves & Savitch LLP

(57) ABSTRACT

In a computer system with clouds of a plurality of bases and a storage management server, where the cloud of the base includes a compute server on which a container execution platform for executing a container is built, and a storage server that provides a storage area for storing data, the storage management server stores a storage characteristic of a storage area of a storage server in the cloud of each base and connection information to the storage area, and the compute server acquires, from the storage management server, a storage characteristic and connection information of the storage area in the base to which the compute server belongs, determines a storage area to be allocated to the container of the container execution platform based on the storage characteristic, and allocates the determined storage area to the container based on the connection information.

7 Claims, 14 Drawing Sheets

(56)          References Cited

U.S. PATENT DOCUMENTS

| | | | |
|---|---|---|---|
| 2023/0115261 A1* | 4/2023 | Xiao | G06F 9/45558 |
| | | | 718/104 |
| 2023/0224362 A1* | 7/2023 | Yamauchi | H04L 67/1008 |
| | | | 709/224 |
| 2024/0134701 A1* | 4/2024 | Xia | G06F 9/45558 |
| 2024/0168663 A1* | 5/2024 | Salomon | G06F 3/067 |
| 2025/0060889 A1* | 2/2025 | Salomon | G06F 3/0604 |

* cited by examiner

Figure 5:
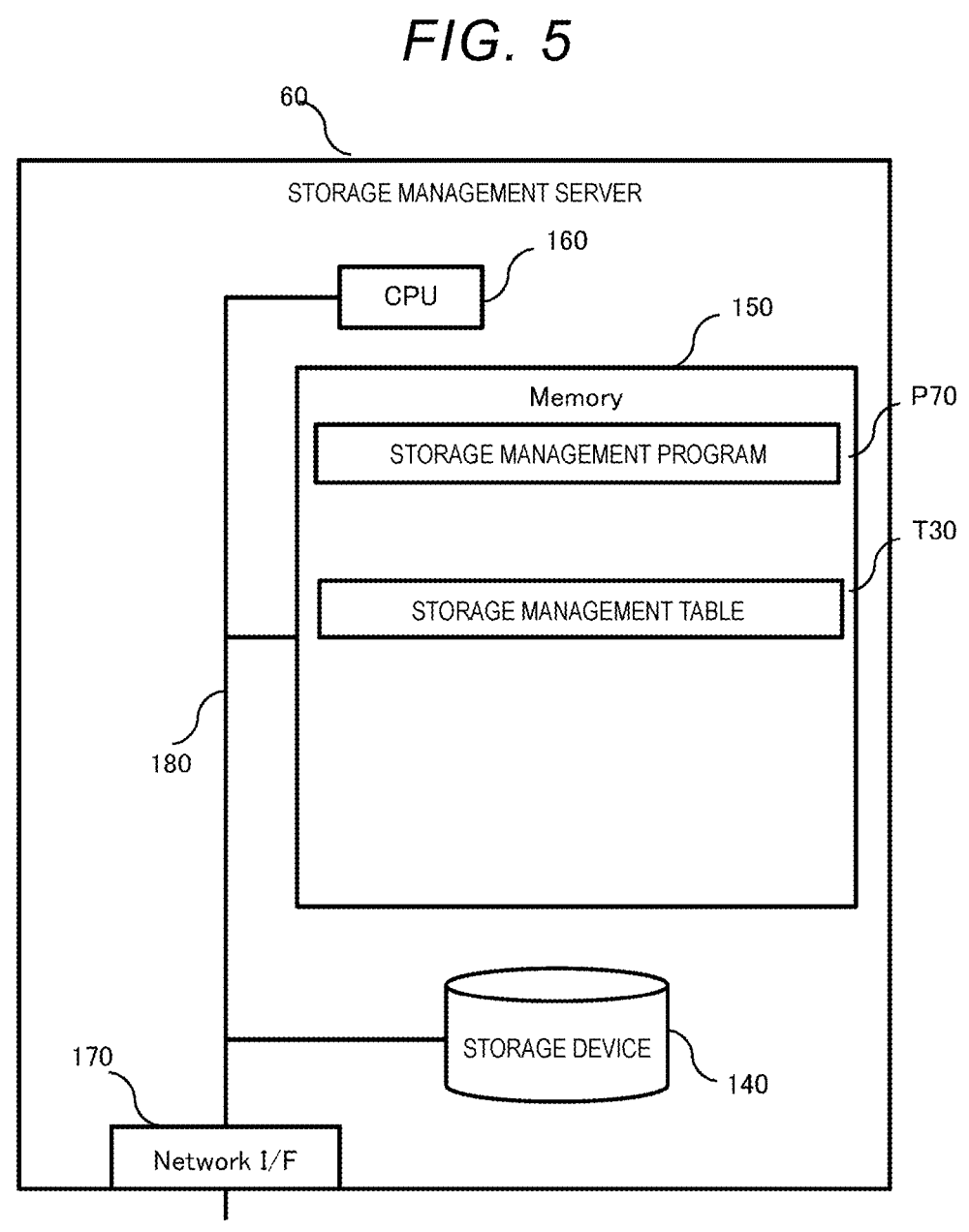

STORAGE MANAGEMENT SERVER

160

CPU

150

Memory

P70

STORAGE MANAGEMENT PROGRAM

T30

STORAGE MANAGEMENT TABLE

180

STORAGE DEVICE

140

170

Network I/F

| POOL ID | STORAGE CHARACTERISTIC |
|---------|------------------------|
| 1 | High Performance |
| 2 | High Performance |
| 3 | Low cost |
| ... | |

T10

| POOL ID | STORAGE CONNECTION DESTINATION | ACCOUNT/PASSWORD |
|---------|-------------------------------|------------------|
| 1 | iSCSI name 1 | Admin / Pass |
| 2 | iSCSI name 2 | Admin / Pass |
| 3 | iSCSI name 3 | Admin / Pass |
| 4 | iSCSI name 4 | Admin / Pass |
| ... | | ... |

| SITE | DEVICE ID | POOL ID | STORAGE CONNECTION DESTINATION | ACCOUNT/ PASSWORD | PERFOR- MANCE | COST | USE PROHIBITION FLAG | STORAGE CHARACTERI- STIC |
|------|-----------|---------|-------------------------------|-------------------|---------------|------|----------------------|--------------------------|
| 1 | 1 | 1 | iSCSI name 1 | Admin / Pass | 10GB /s | 0.2$ |  | High performance |
| 1 | 1 | 2 | iSCSI name 2 | Admin / Pass | 3GB/ s | 0.05$ | × |  |
| 2 | 2 | 3 | iSCSI name 3 | Admin / Pass | 8GB/ s | 0.1$ |  | High performance |
| … |  | … |  |  | … |  |  |  |

| POOL | VOLUME | CONTAINER APPLICATION | CONTAINER ORCHESTRATOR VOLUME (PV) |
|------|--------|-----------------------|-------------------------------------|
| Pool1 | Volume1 | APP 1 | PV1 |
| Pool1 | Volume1 | APP 2 | PV1 |
| Pool1 | Volume2 | APP 3 | PV2 |
| Pool2 | Volume3 | APP 4 | PV3 |

Figure 12:
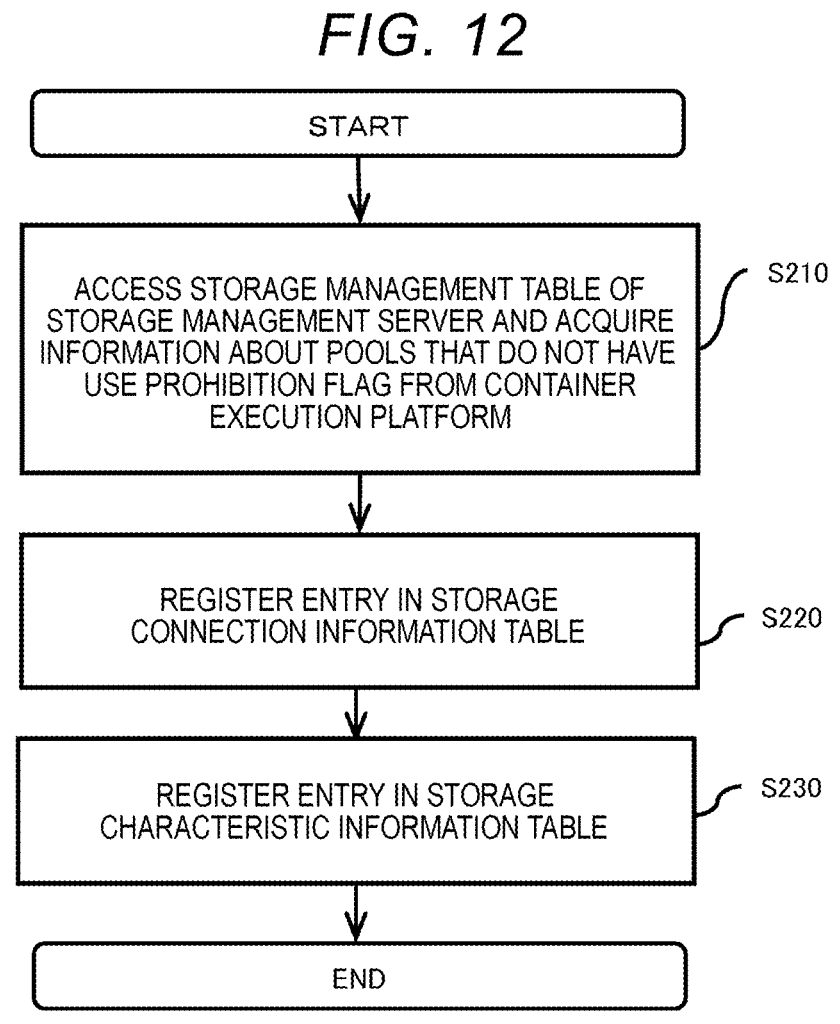

START

ACCESS STORAGE MANAGEMENT TABLE OF
STORAGE MANAGEMENT SERVER AND ACQUIRE
INFORMATION ABOUT POOLS THAT DO NOT HAVE
USE PROHIBITION FLAG FROM CONTAINER
EXECUTION PLATFORM    S210

REGISTER ENTRY IN STORAGE
CONNECTION INFORMATION TABLE    S220

REGISTER ENTRY IN STORAGE
CHARACTERISTIC INFORMATION TABLE    S230

END

FIG. 13

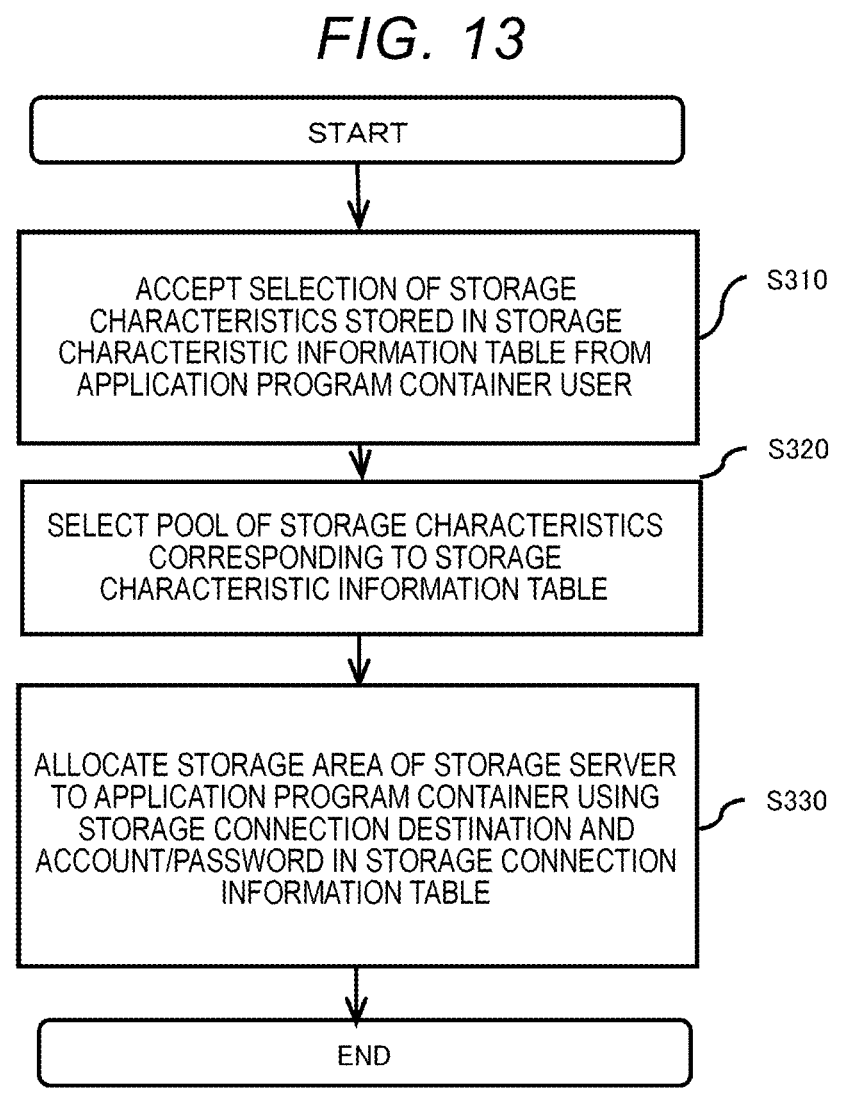

```
┌─────────────────────────────────────┐
│               START                  │
└─────────────────────────────────────┘
                  │
                  ▼
┌─────────────────────────────────────┐
│      ACCEPT SELECTION OF STORAGE     │        S310
│    CHARACTERISTICS STORED IN STORAGE │
│   CHARACTERISTIC INFORMATION TABLE FROM │
│    APPLICATION PROGRAM CONTAINER USER │
└─────────────────────────────────────┘
                  │                              S320
                  ▼
┌─────────────────────────────────────┐
│    SELECT POOL OF STORAGE CHARACTERISTICS │
│         CORRESPONDING TO STORAGE     │
│      CHARACTERISTIC INFORMATION TABLE │
└─────────────────────────────────────┘
                  │
                  ▼
┌─────────────────────────────────────┐
│  ALLOCATE STORAGE AREA OF STORAGE SERVER │
│   TO APPLICATION PROGRAM CONTAINER USING │   S330
│    STORAGE CONNECTION DESTINATION AND │
│   ACCOUNT/PASSWORD IN STORAGE CONNECTION │
│            INFORMATION TABLE         │
└─────────────────────────────────────┘
                  │
                  ▼
┌─────────────────────────────────────┐
│               END                    │
└─────────────────────────────────────┘
```

COMPUTER SYSTEM AND STORAGE MANAGEMENT METHOD FOR ALLOCATING STORAGE AREAS TO CONTAINERS BASED ON STORAGE CHARACTERISTICS AND CONNECTION INFORMATION IN A MULTI-BASE CLOUD ENVIRONMENT

CROSS-REFERENCE TO RELATED APPLICATIONS

This application claims priority from JP 2024-067053, filed Apr. 17, 2024. The entire content of the priority application is incorporated herein by reference.

BACKGROUND OF THE INVENTION

Field of the Invention

The present invention relates to a technique for managing storage servers in clouds of a plurality of bases.

Description of Related Art

A container execution platform that manages an application as a container and automates an operation is becoming widely used to improve portability and reduce a load on a computer system. A container is a collection of application execution environments that can be used like an individual server. A container execution platform is a platform for efficiently managing an operation of a container, and is realized, for example, by a container orchestration program.

For example, U.S. Pat. No. 10,579,403 discloses a technology for placing containers in one cloud (such as a virtual machine (VM)) based on a container policy. The container policy discloses computing-related qualities, storage-related qualities, and network-related qualities that must be satisfied by software and hardware that form a platform for supporting an execution of a virtual machine.

In a hybrid cloud environment, storage is managed across a plurality of bases. There is a demand to use storage characteristics that are set for managing a storage in an existing hybrid cloud environment to set storage characteristics in a container execution platform environment.

When setting storage characteristics on a container execution platform, a container orchestration program administrator and a storage administrator are generally different people, so storage server information to be set in the container orchestration program must be exchanged manually between the container orchestration program administrator and the storage administrator, making operations complicated.

In addition, when an application operator of a container orchestration program migrates an application between bases, if the operator wants to use a storage area with similar storage characteristics at a migration source base and a migration destination base, but the migration destination base does not have or cannot use a storage area with the same storage characteristics, the operator does not know which storage characteristics to set. In addition, when names of the storage characteristics used in the container orchestration program at the migration source and destination bases change, application settings, or the like cannot be reused and manual file changes are required.

Furthermore, when recreating the container execution platform so that data can be inherited, correspondence between a storage server volume stored in the container orchestration program used to build the container execution platform and a volume in a container application program will disappear. To maintain this correspondence, an application operator of the container orchestration program must remember the correspondence with the volumes on each storage server.

SUMMARY OF THE INVENTION

The present invention is made in consideration of the circumstances described above, and has an object to provide a technique that enables a storage characteristic to be easily and appropriately set in a container execution platform.

In order to achieve the above-described object, a computer system according to one aspect is a computer system with clouds of a plurality of bases and a management server, where the cloud includes a compute server on which a container execution platform for executing a container is built, and a storage server that provides a storage area for storing data, the management server stores a storage characteristic of a storage area of a storage server in the cloud of each base and connection information to the storage area, and the compute server acquires, from the management server, a storage characteristic and connection information of the storage area in the base to which the compute server belongs, determines a storage area to be allocated to the container of the container execution platform based on the storage characteristic, and allocates the determined storage area to the container based on the connection information.

According to the present invention, a storage characteristic can be easily and appropriately set in a container execution platform.

BRIEF DESCRIPTION OF THE DRAWINGS

FIG. 5 is a diagram illustrating a configuration of a storage management server according to the embodiment;

FIG. 9 is a diagram illustrating a configuration of a storage management table according to the embodiment;

FIG. 10 is a diagram illustrating a configuration of a container app-volume correspondence table according to the embodiment;

FIG. 12 is a flowchart of storage characteristic creation processing according to the embodiment;

FIG. 13 is a flowchart of storage allocation processing according to the embodiment;

DESCRIPTION OF EMBODIMENTS

An embodiment will be described with reference to the drawings. The embodiment described below does not limit the invention as claimed, and not all of elements and combinations thereof described in the embodiment are necessarily essential to the solution of the invention.

In the following description, various types of information may be described using the expression "aaa table", but the various types of information may be expressed in data structures other than tables. The "aaa table" can also be called "aaa information" to indicate independence from the data structure.

Also, in the following description, a "network I/F" may include one or more communication interface devices. The one or more communication interface devices may be one or more homogeneous communication interface devices (for example, one or more Network Interface Cards (NICs)), or two or more heterogeneous communication interface devices (for example, a NIC and a Host Bus Adapter (HBA)).

Also, in the following description, a configuration of each table is an example, and one table may be divided into two or more tables, or all or part of two or more tables may be combined into one table.

Furthermore, in the following description, the storage device may be a physical non-volatile storage device (for example, an auxiliary storage device), such as a Hard Disk Drive (HDD), a Solid State Drive (SSD), or a Storage Class Memory (SCM).

In the following description, a memory may be a volatile memory or a non-volatile memory.

Also, in the following description, processing may be described with a "program" as an operating entity. However, a program is executed by a processor such as a Central Processing Unit (CPU) to perform defined processing using a storage unit (for example, a memory) and/or an interface (for example, a port) as appropriate, so the operating entity of the processing may also be the program. Processing described with a program as the operating entity may also be processing performed by a processor or a computer (for example, a server) having that processor.

In the following description, two or more programs may be realized as one program, or one program may be realized as two or more programs.

In the following description, an ID is used as identification information for an element, but other types of identification information may be used instead of or in addition to the ID.

In addition, in the following description, when describing elements of the same type without distinguishing between them, common reference numbers will be used, and when describing elements of the same type with distinction between them, the reference numbers of those elements will be used.

<Overview>

Figure 1:
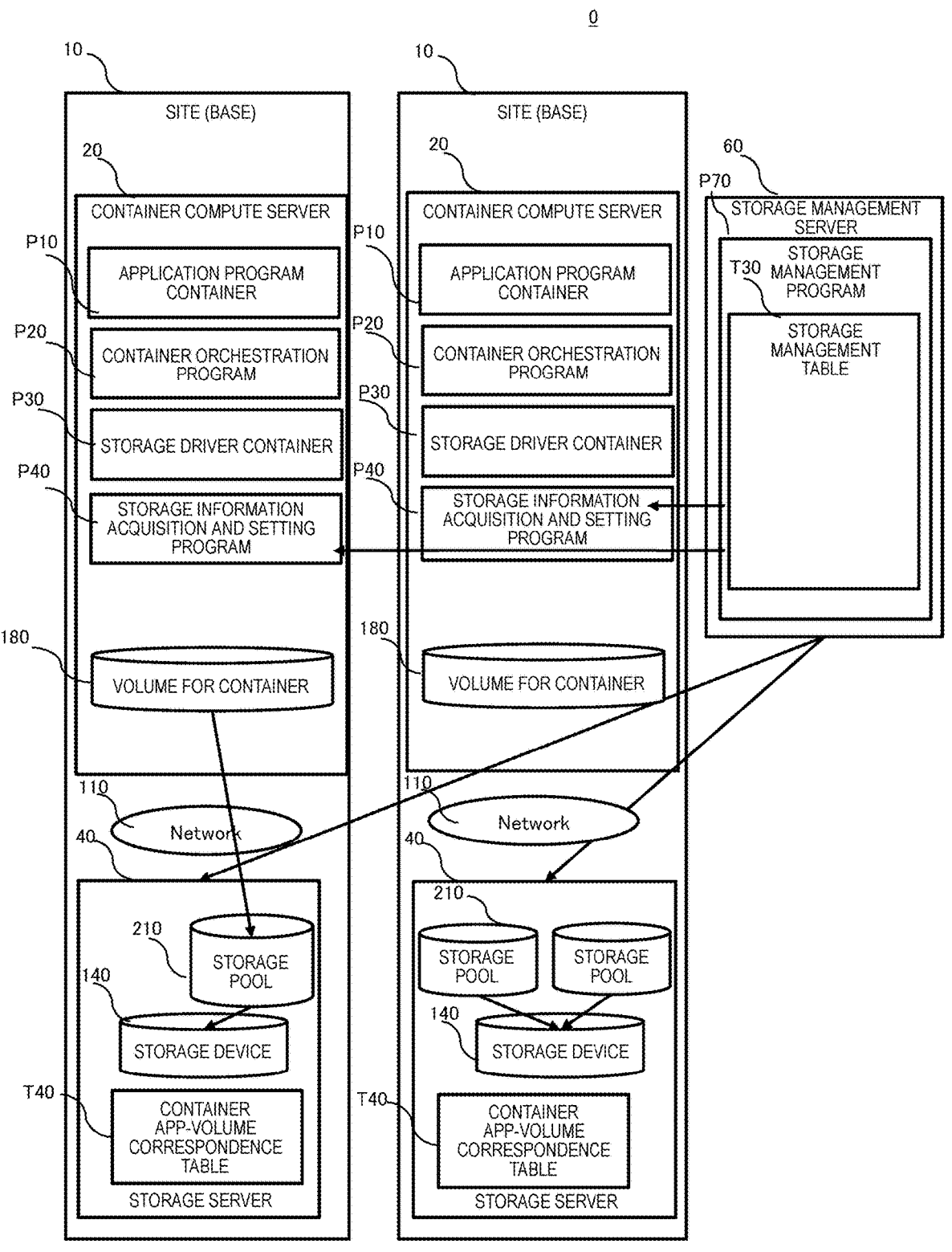
FIG. 1 is a diagram illustrating an overview of storage characteristic setting processing according to an embodiment.

FIG. 1 is a diagram illustrating an overview of the embodiment.

In this embodiment, a storage information acquisition and setting program P40 of a container compute server 20 acquires storage characteristics and storage information from a storage management table T30 and a container app-volume correspondence table T40, and registers the storage characteristics in a container execution platform constructed by a container orchestration program P20.

A computer system 0 includes a plurality of sites (bases) 10 and a storage management server 60. Each site 10 includes the container compute server 20 and a storage server 40. The container compute server 20 and the storage server 40 may each be a physical server or a virtual server configured with virtual machines. The site 10 may be an on-premise cloud or a public cloud. The storage management server 60 may be located within any of the sites 10 or outside the site 10.

The container compute server 20 includes an application program container P10, the container orchestration program P20, a storage driver container P30, and the storage information acquisition and setting program P40. The storage driver container P30 and the storage information acquisition and setting program P40 are provided for the container orchestration program P20, for example, by an administrator of the container orchestration program P20.

During installation, the administrator of the container orchestration program P20 inputs connection destination information to a storage management program P70, information as to whether there are any volumes in the storage server 40 that wish to be reused in order to reconfigure the container orchestration program P20, and the like.

The storage management server 60 manages the storage servers 40 at the plurality of sites 10 that make up the hybrid cloud. The storage management server 60 stores storage characteristics, performance, cost, and connection destination information of these storage servers 40. A storage administrator can set a usage prohibition flag in the storage management table T30 for a storage pool 210 (also simply called a pool 210. An example of a storage area) that is not to be used by the container orchestration program P20.

The storage server 40 includes the pool 210 managed in the storage management table T30, a storage device 140 that is a source of the pool 210, and the container app-volume correspondence table T40.

If volume reuse is set by the administrator of the container orchestration program P20 when the storage information acquisition and setting program P40 is provided, the storage information acquisition and setting program P40 refers to the container app-volume correspondence table T40 and executes, for the container orchestration program P20, usage settings for the pool 210 and allocation of a volume linked to the volume to be reused on the storage server 40.

The storage information acquisition and setting program P40 refers to the storage management table T30 and performs connection settings to the storage server 40 for the pool 210 that is available to the container orchestration program P20. The storage information acquisition and setting program P40 also acquires the storage characteristics for the pool on the storage management program P70 and sets these storage characteristics as the storage characteristics on the container orchestration program P20.

When migrating an application program container P10 from one site 10 to another site 10, an operator of the container orchestration program P20 must notify the storage management program P70 of this migration. When there is no storage server 40 with the same storage characteristics at the destination site 10, the storage management program P70 searches for a storage server 40 with similar storage characteristics at the destination site 10. The storage management program P70 then finds the storage characteristics with the closest characteristics at the destination site 10 and has the storage information acquisition and setting program P40 set the storage characteristics on the destination container orchestration program P20 with the same names as the storage characteristics on the source container orchestration program P20.

<System Configuration>

Figure 2:
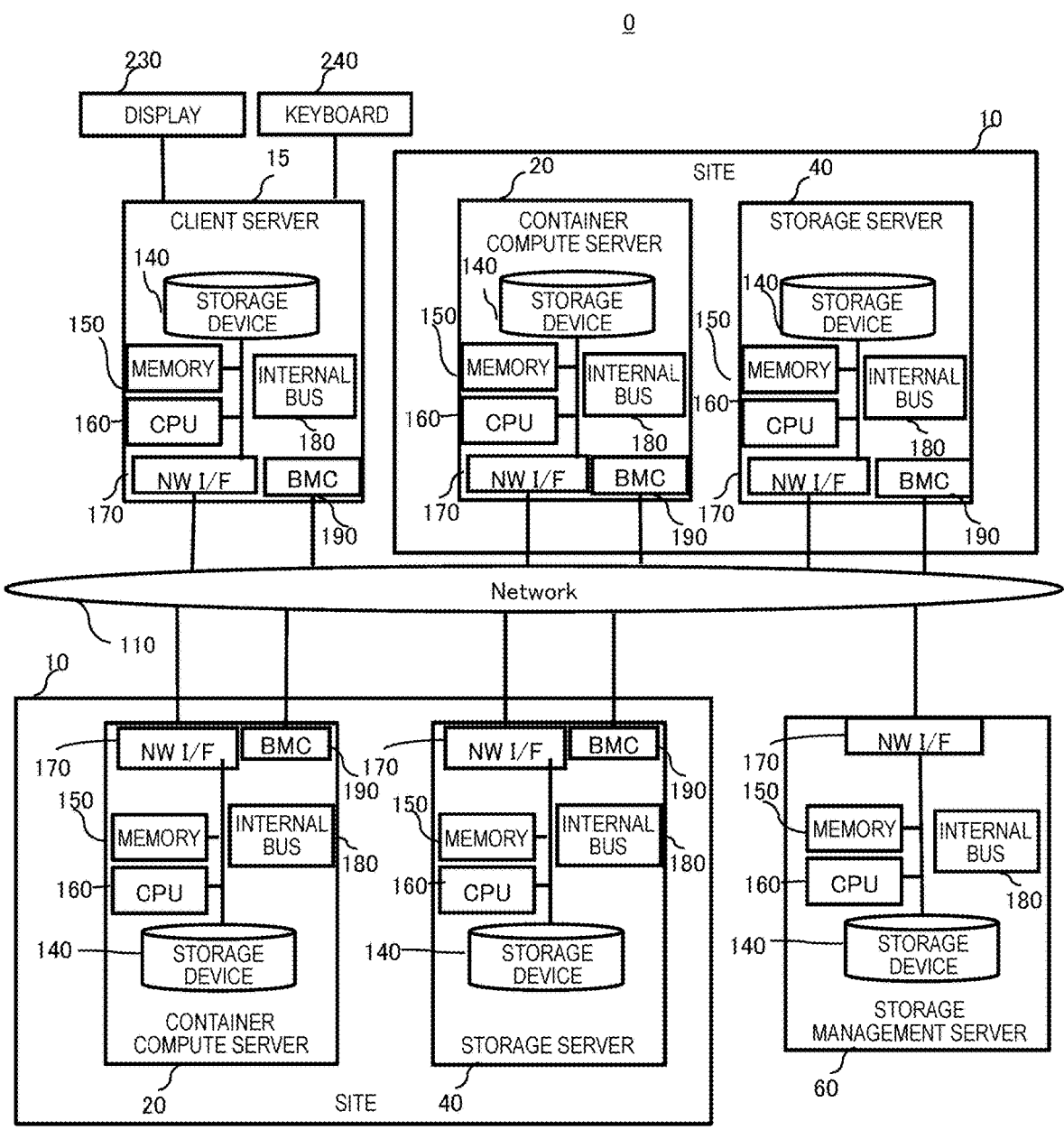
FIG. 2 is a diagram illustrating a configuration of a computer system according to the embodiment.

FIG. 2 is a diagram illustrating a configuration of a computer system according to the embodiment.

The computer system 0 includes one or more client servers 15, a plurality of sites 10, the storage management server 60, and a network 110. Each site 10 includes one or more container compute servers 20 and one or more storage servers 40. The client server 15, the container compute server 20, the storage server 40, and the storage management server 60 are connected via the network 110. The network 110 includes a Local Area Network (LAN) and a Wide Area Network (WAN).

The container compute server 20 is a server that handles the computation of applications (also called apps). The container compute server 20 runs the container orchestration program P20 to configure a container execution platform. In the container compute server 20, the application program container P10 is started by the container orchestration program P20. The application program container P10 executes specified processing and records data in the storage server 40.

The client server 15 is a server used by a user of the container application, an administrator of the container orchestration program P20, an administrator of the storage server 40, and the like. The client server 15 accepts input of various pieces of information for managing the container compute server 20 and the storage server 40, transmits the various pieces of information to the container compute server 20 and the storage management server 60 via the network 110, executes processing, and receives and displays processing results, and the like.

The storage server 40 executes a block storage program P90 (see FIG. 6) to store various data in the storage device 140 of the storage server 40 and to execute processing to read data from the storage device 140.

The storage management server 60 is a server that executes processing for managing the storage server 40 in each site 10.

Figure 3:
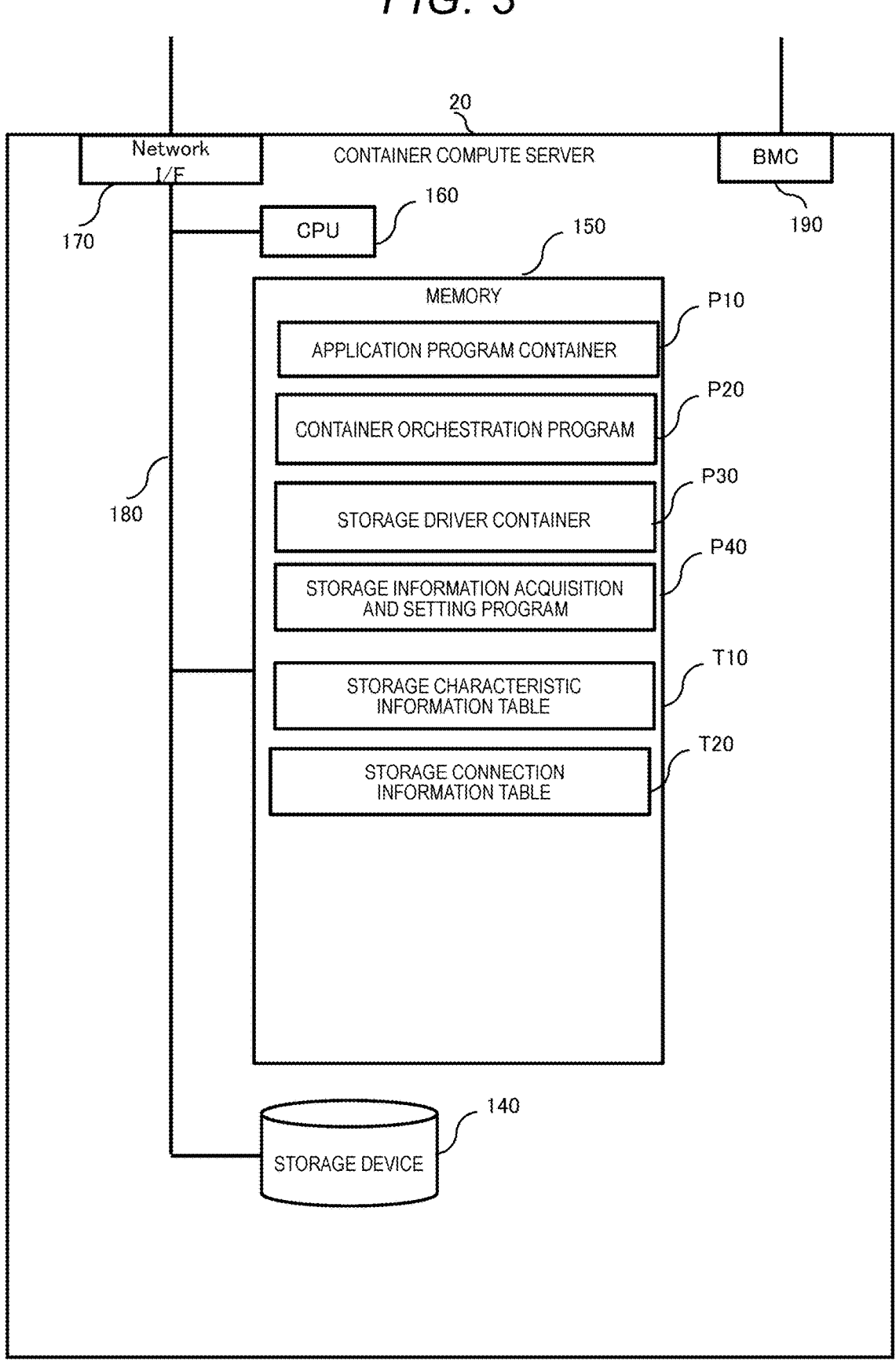
FIG. 3 is a diagram illustrating a configuration of a container compute server according to the embodiment.

FIG. 3 is a diagram illustrating a configuration of a container compute server according to the embodiment.

The container compute server 20 includes a network interface (NW I/F) 170, a Baseboard Management Controller (BMC) 190, a memory 150, a CPU 160 as an example of a processor, a storage device 140, and an internal bus 180. The network interface 170, the memory 150, the CPU 160, and the storage device 140 are connected via the internal bus 180.

The network interface 170 is, for example, an interface such as a wired LAN card or a wireless LAN card, and communicates with other devices (for example, the client server 15, other container compute servers 20, the storage server 40, and the storage management server 60) via the network 110.

The CPU 160 executes various processing according to programs stored in the memory 150 and/or the storage device 140.

The storage device 140 is a non-volatile storage medium that stores various data, and may be an HDD, SSD, or SCM.

The BMC 190 is a device that enables external power control of the device (here, the container compute server 20) accommodating the BMC 190. The BMC 190 operates independently of the CPU 160 and memory 150, and can accept external power control requests and control (turning the power on and off) the power of the device even when a failure occurs in the CPU 160 or memory 150.

The memory 150 is, for example, a Random Access Memory (RAM), and stores programs executed by the CPU 160 and necessary information. The memory 150 stores the application program container P10, the container orchestration program P20, the storage driver container P30, the storage information acquisition and setting program P40, a storage characteristic information table T10, and a storage connection information table T20. Although not illustrated, the memory 150 also stores programs necessary to function as a server, such as an OS.

The application program container P10 is a container that executes an application program (also simply called an application or app) that a user wants to use. The application executes various processing using a storage area such as a pool provided by the storage server 40. The application program container P10 is managed by the container orchestration program P20.

The container orchestration program P20 is executed by the CPU 160 to construct a container execution platform that starts and manages the operation of the application program container P10. All programs running in the container compute server 20 are managed as containers by, for example, the container orchestration program P20.

The storage driver container P30 is a program for using the block storage program P90 running on the storage server 40 from an upper container in a container execution environment constructed by the container orchestration program P20.

The storage information acquisition and setting program P40 acquires storage characteristics from the storage management server 60 and stores storage server information and storage characteristics in the storage characteristic information table T10 and the storage connection information table T20 so that the application program container P10 can use the storage server 40.

The storage characteristic information table T10 stores the storage characteristics of each pool used by the application program container P10. Details of the storage characteristic information table T10 will be described below using FIG. 7.

The storage connection information table T20 stores information on the connection destination to the storage server 40 used by the application program container P10. Details of the storage connection information table T20 will be described below using FIG. 8.

Figure 4:
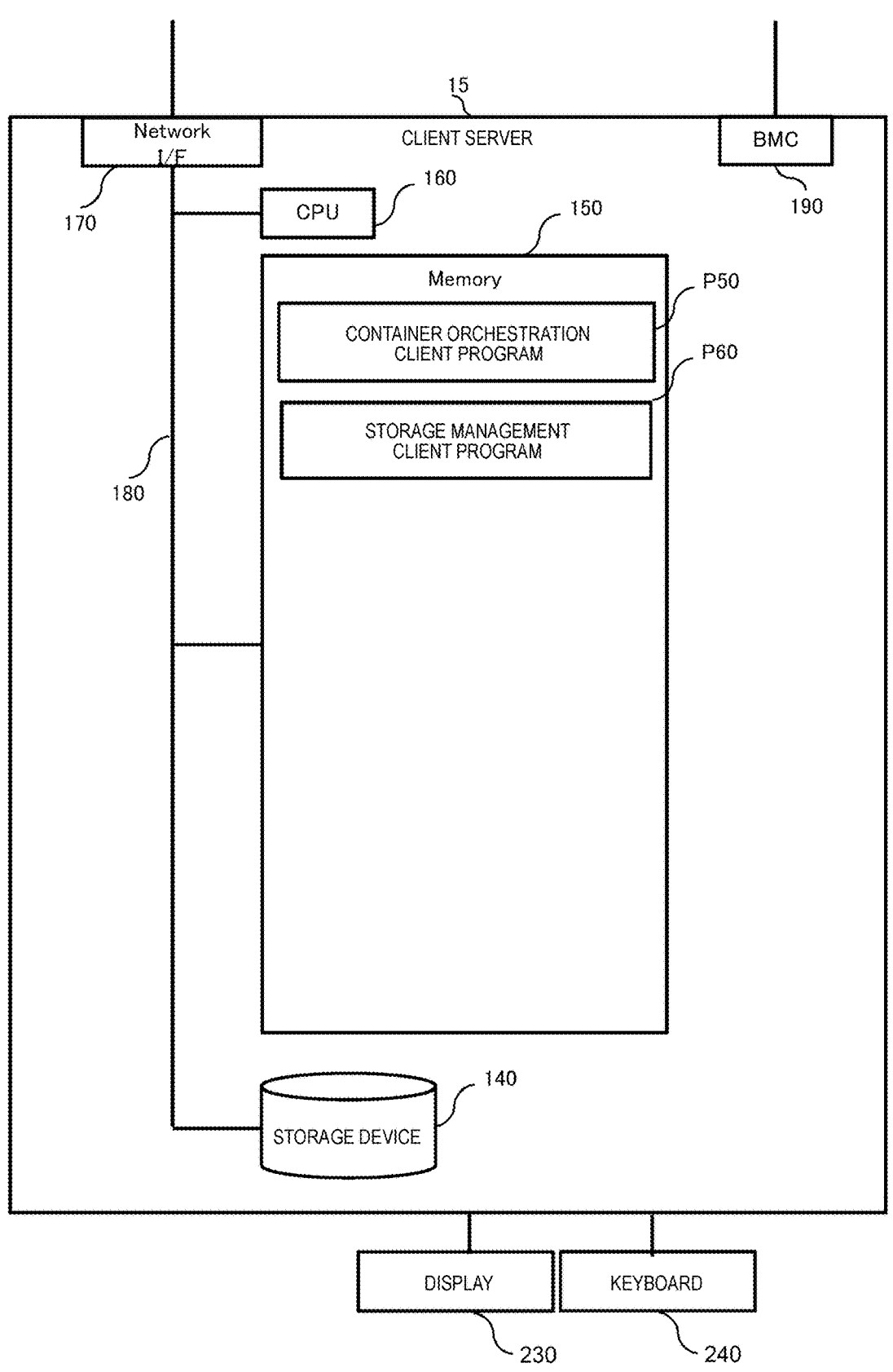
FIG. 4 is a diagram illustrating a configuration of a client server according to the embodiment.

FIG. 4 is a diagram illustrating a configuration of a client server according to the embodiment.

The client server 15 includes a network interface 170, a BMC 190, a memory 150, a CPU 160, a storage device 140, and an internal bus 180. In this specification, similar components are denoted by the same reference numerals and descriptions thereof may be omitted. The network interface 170, the memory 150, the CPU 160, and the storage device 140 are connected via the internal bus 180. The client server 15 is connected to a display 230 that displays various information, and a keyboard 240 that accepts input of various information from a user.

The memory 150 stores a container orchestration client program P50 and a storage management client program P60.

The storage management client program P60 acquires and operates information about the container compute server 20 and storage server 40 via the container orchestration client program P50 or by communicating with the storage management server 60.

The container orchestration client program P50 communicates with the container orchestration program P20 in accordance with an instruction from the storage management client program P60 to acquire and operate information about the container compute server 20.

FIG. 5 is a diagram illustrating a configuration of a storage management server according to the embodiment.

The storage management server 60 includes a network interface 170, a memory 150, a CPU 160, a storage device 140, and an internal bus 180. The network interface 170, the memory 150, the CPU 160, and the storage device 140 are connected via the internal bus 180.

The memory 150 stores the storage management program P70 and the storage management table T30.

The storage management program P70 manages the storage characteristics and performance of the storage server 40 at each site 10, and executes container remote copy processing described below.

The storage management table T30 stores information such as the storage characteristics and performance of the storage server 40. Details of the storage management table T30 will be described below using FIG. 9.

Figure 6:
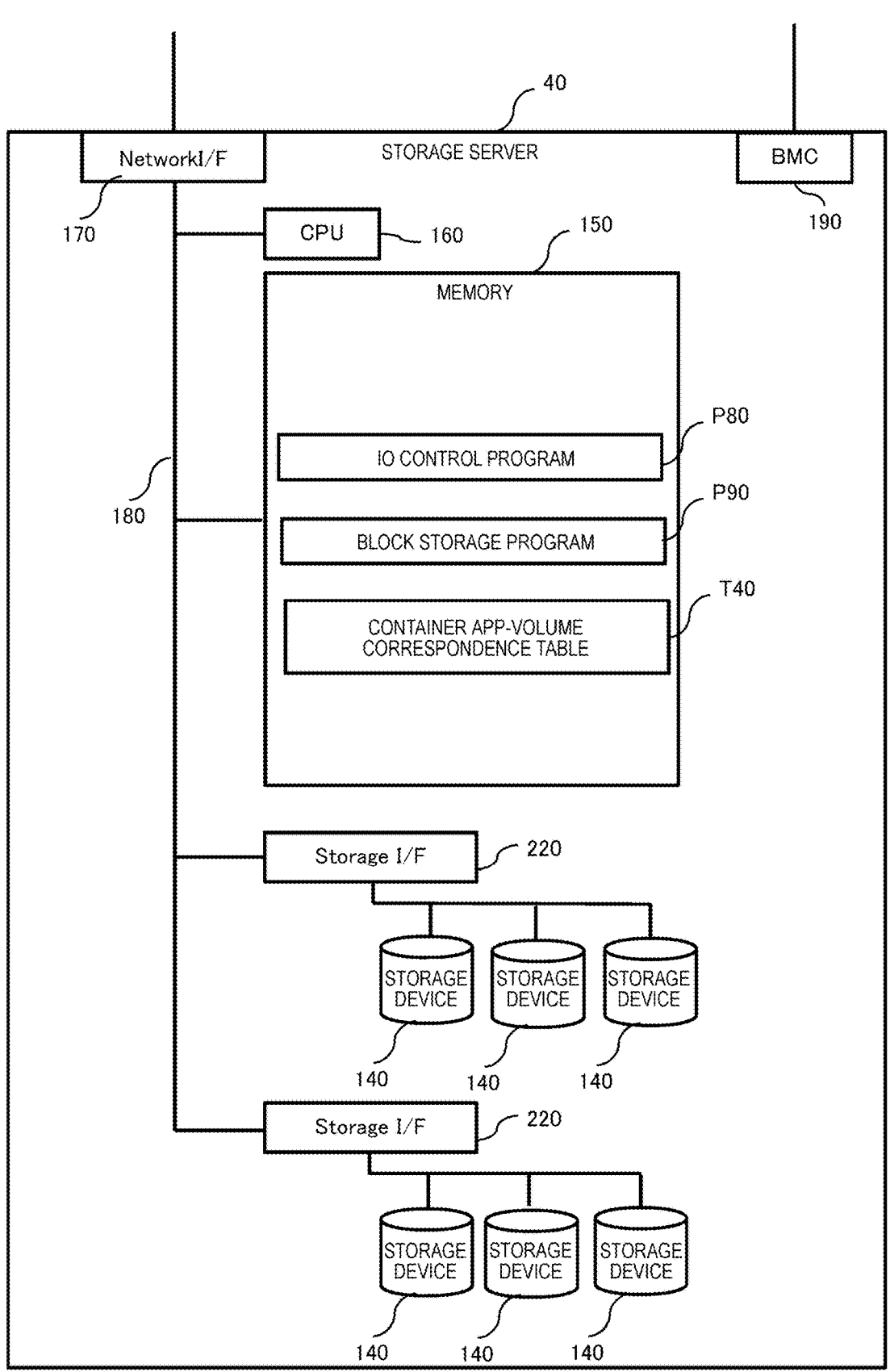
FIG. 6 is a diagram illustrating a configuration of a storage server according to the embodiment.

FIG. 6 is a diagram illustrating a configuration of a storage server according to the embodiment.

The storage server 40 includes a network interface 170, a BMC 190, a memory 150, a CPU 160, one or more storage interfaces (storage I/F) 220, a plurality of storage devices 140, and an internal bus 180. The network interface 170, the memory 150, the CPU 160, and the storage interface 220 are connected via the internal bus 180.

The storage interface 220 connects the CPU 160 and the storage device 140. The CPU 160 can read and write data from and to the storage device 140 via the storage interface 220. For communication between the CPU 160 and the storage interface 220, Fibre channel (FC), Serial Attached Technology Attachment (SATA), Serial Attached SCSI (SAS), Integrated Device Electronics (IDE), or the like can be used. In this embodiment, the pool 210 is configured based on the storage areas of one or more storage devices 140.

The memory 150 stores an IO control program P80, the block storage program P90, and the container app-volume correspondence table T40.

The IO control program P80 accepts data reads and writes from the container compute servers 20, and issues a data read and write request and exchanges data with the block storage program P90 of the target storage server 40.

The block storage program P90 saves data to the storage device 140 and reads data from the storage device 140 in accordance with read and write requests from the IO control program P80.

Next, the detailed configuration of the storage characteristic information table will be described.

Figures 7, 8:
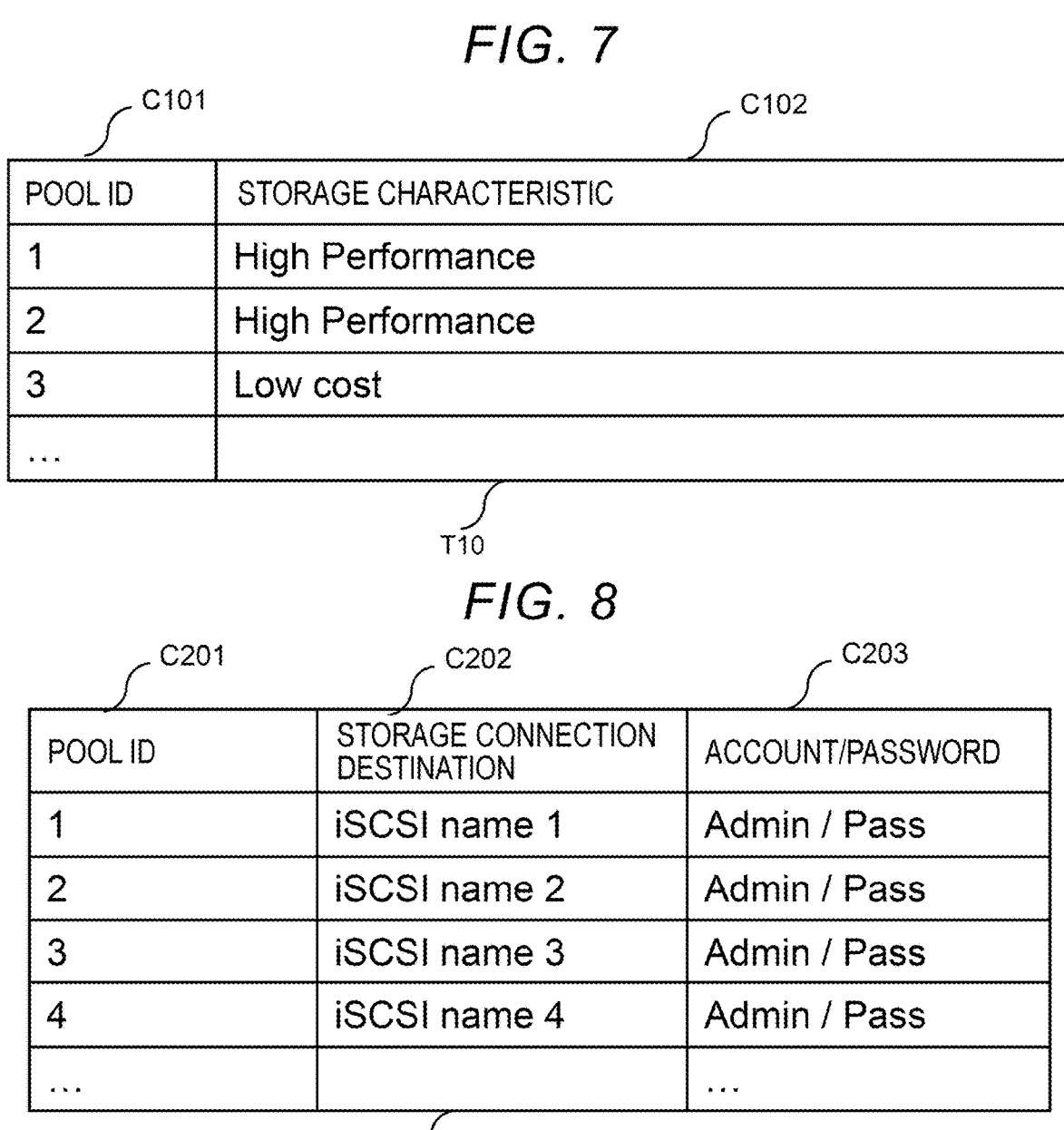
FIG. 7 is a diagram illustrating a configuration of a storage characteristic information table according to the embodiment.
FIG. 8 is a diagram illustrating a configuration of a storage connection information table according to the embodiment.

FIG. 7 is a diagram illustrating the configuration of the storage characteristic information table according to the embodiment.

The storage characteristic information table T10 manages the storage characteristics of each pool. The storage characteristic information table T10 makes it possible to specify the pool corresponding to the storage characteristics designated by a user of the container orchestration program P20. The storage characteristic information table T10 stores entries for each storage pool. The entries in the storage characteristic information table T10 include fields for a pool ID C101 and a storage characteristic C102.

The pool ID C101 stores identification information (pool ID) that identifies the pool. The storage characteristic C102 stores the storage characteristics of the pool with the pool ID corresponding to the entry. The information in the storage characteristic information table T10 is stored by the storage information acquisition and setting program P40.

Next, the detailed configuration of the storage connection information table will be described.

FIG. 8 is a diagram illustrating the configuration of the storage connection information table according to the embodiment.

The storage connection information table T20 manages information for connecting to each pool. The storage connection information table T20 stores entries for each pool. The entries in the storage connection information table T20 include fields for a pool ID C201, a storage connection destination C202, and an account/password C203. The pool ID of the pool corresponding to the entry is stored in the pool ID C201. The storage connection destination C202 stores information about the connection destination of the pool corresponding to the entry. The account/password C203 stores the account name and password for connecting to the connection destination corresponding to the entry. The information in the storage connection information table T20 is stored by the storage information acquisition and setting program P40.

Next, the detailed configuration of the storage management table will be described.

FIG. 9 is a diagram illustrating the configuration of the storage management table according to the embodiment.

The storage management table T30 manages information about pools at a plurality of sites 10. The storage management table T30 stores entries for each pool. The entries in the storage management table T30 include fields for a site C301, a device ID C302, a pool ID C303, a storage connection destination C304, an account/password C305, a performance C306, a cost C307, a use prohibition flag C308, and a storage characteristic C309.

The site C301 stores identification information of the site 10 in which the pool corresponding to the entry exists. The device ID C302 stores identification information (device ID) of the storage server 40 in which the pool corresponding to the entry exists. The pool ID C303 stores the pool ID of the pool corresponding to the entry. The storage connection destination C304 stores information on the connection destination when connecting to the pool corresponding to the entry. The account/password C305 stores the account name and password when connecting to the pool corresponding to the entry. The performance C306 stores information on the performance of the pool corresponding to the entry. The cost C307 stores the cost of using the pool corresponding to the entry. The cost C307 is set, for example, by a storage administrator who manages the storage server 40.

The use prohibition flag C308 stores a use prohibition flag indicating that the pool corresponding to the entry is prohibited from being used from the container execution environment constructed by the container orchestration program P20. The use prohibition flag is set by the administrator of the storage server 40. The storage characteristic C309 stores the storage characteristics set in the container execution environment for the pool corresponding to the entry.

Next, a detailed configuration of the container app-volume correspondence table will be described.

FIG. 10 is a diagram illustrating a configuration of the container app-volume correspondence table according to the embodiment.

The container app-volume correspondence table T40 manages a correspondence between the application (called a container application) executed in the container at the site and the volume used. The container app-volume correspondence table T40 is referenced by the storage information acquisition and setting program P40 to restore the previously used volume and container orchestrator volume (PV) when reconfiguring the container execution environment. The entries in the container app-volume correspondence table T40 include fields for a pool C401, a volume C402, a container application C403, and a container orchestrator volume (PV) C404.

The pool C401 stores identification information of the pool used by the container application corresponding to the entry. The volume C402 stores a volume assigned to the container application corresponding to the entry. The container application C403 stores identification information of the container application corresponding to the entry. The container orchestrator volume (PV) C404 stores information on the volume (Persistent Volume: PV) used by the container application corresponding to the entry.

Next, a processing operation in the computer system 1 will be described.

First, storage information registration processing for registering storage information in the storage management server 60 will be described.

Figure 11:
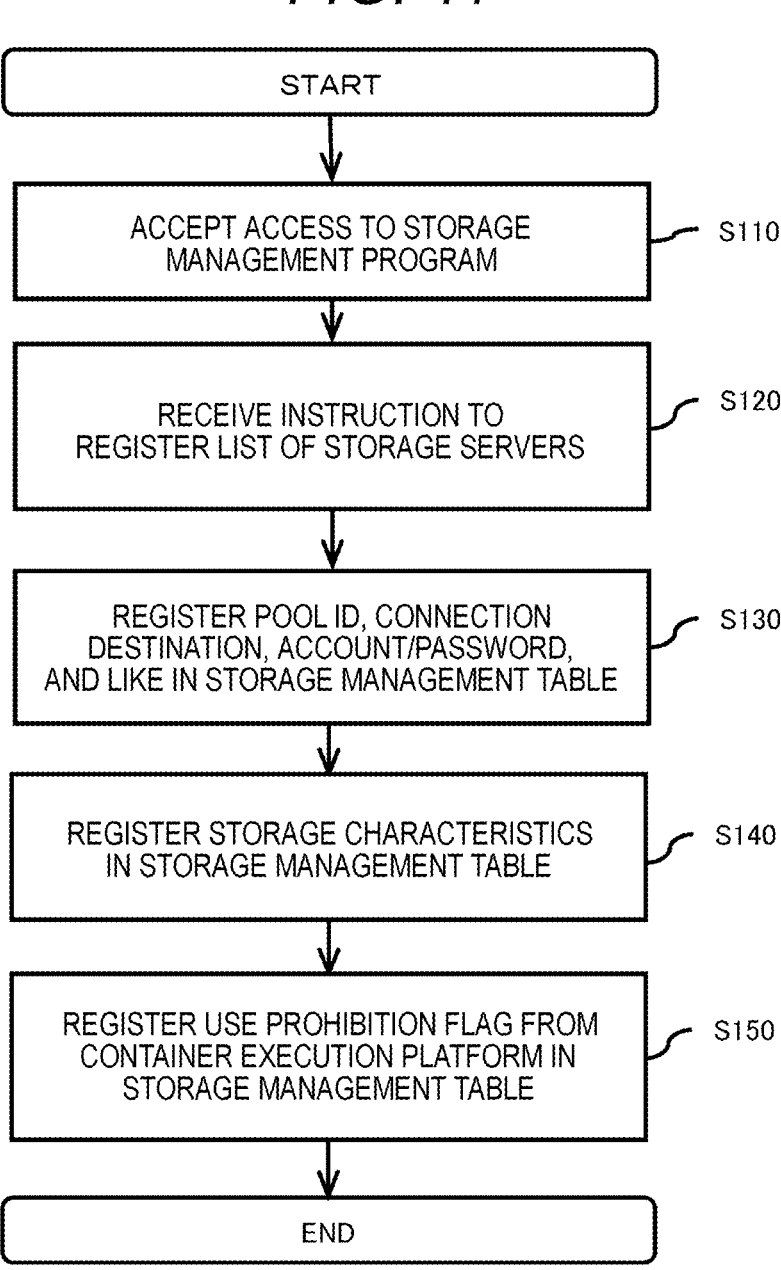
FIG. 11 is a flowchart of storage information registration processing according to the embodiment.

FIG. 11 is a flowchart of storage information registration processing according to the embodiment.

First, the storage management client program P60 (more precisely, the CPU 160 executing the storage management client program P60) of the client server 15 receives an instruction from a storage administrator (storage administrator) to access the storage management program P70 of the storage management server 60, and requests access to the storage management program P70 (S110).

Next, the storage management program P70 of the storage management server 60 receives an instruction from the client server 15 to register a list of storage servers by the storage administrator (S120). The storage server list registration includes the pool ID to be registered, the storage connection destination, the account/password, the performance, and the cost, and when the pool is prohibited from use from the container execution platform, the designation of a use prohibition flag and the storage characteristics on the container execution platform.

Next, the storage management program P70 registers information on the pool ID, storage connection destination, account/password, performance, and cost in the storage management table T30 (S130).

Next, when the storage management program P70 has received the storage characteristics, it registers the storage characteristics in the corresponding entry in the storage management table T30 (S140).

Next, when the storage management program P70 has received the designation of the use prohibition flag, it registers the use prohibition flag in the corresponding entry of the storage management table T30 (S150).

Next, storage characteristic creation processing for creating storage characteristics in each container compute server 20 will be described.

FIG. 12 is a flowchart of the storage characteristic creation processing according to the embodiment.

The storage information acquisition and setting program P40 of the container compute server 20 accesses the storage management table T30 of the storage management server 60 and acquires information about pools that do not have a use prohibition flag set indicating that use from the container execution environment is prohibited from the storage management table T30 (S210).

Next, the storage information acquisition and setting program P40 adds an entry for each pool to the storage connection information table T20 based on the acquired information of each pool, and sets the pool ID, storage connection destination, and account/password contained in the acquired information in the entry (S220).

Next, the storage information acquisition and setting program P40 adds an entry for each pool to the storage characteristic information table T10 based on the acquired information of each pool, and sets the pool ID and storage characteristics contained in the acquired information in the entry (S230).

According to the storage characteristic creation processing, the storage administrator can easily and appropriately set the connection information and storage characteristics for the pool registered in the storage management server 60 in the container compute server 20.

Next, storage allocation processing for allocating a pool to the application program container P10 will be described.

FIG. 13 is a flowchart of the storage allocation processing according to the embodiment.

The container orchestration program P20 accepts a selection of storage characteristics to be allocated to the application program container P10 from the storage characteristics registered in the storage characteristic information table T10 from a user (also called a container user) of the application program container P10 to which the pool is to be allocated (S310).

Next, the container orchestration program P20 selects a pool corresponding to the received storage characteristic from the storage characteristic information table T10 (S320).

Next, the storage driver container P30 allocates the storage area of the pool to the application program container P10 via the storage server 40 using the storage connection destination and account/password of the entry corresponding to the selected pool in the storage connection information table T20 (S330).

Next, container execution platform reconstruction processing for reconstructing the container execution platform by the container orchestration program P20 will be described.

Figure 14:
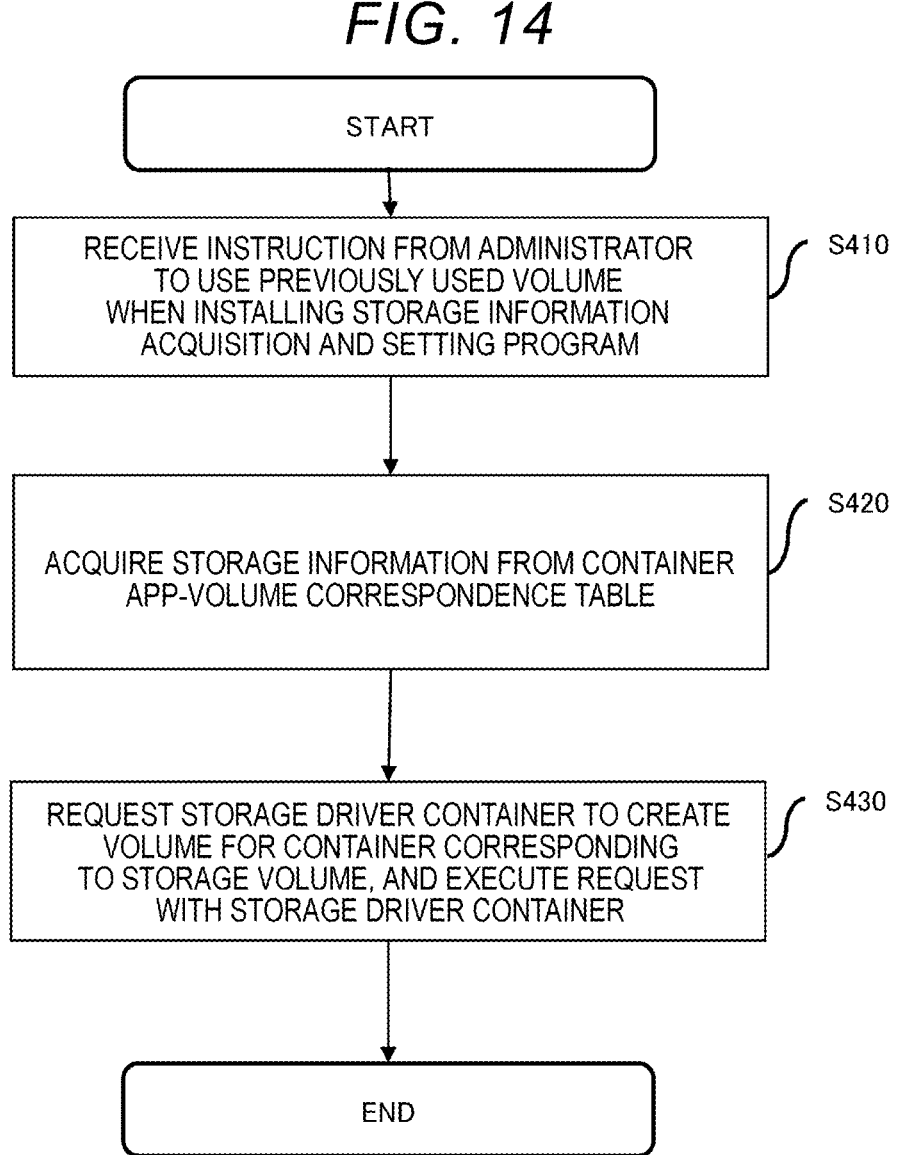
FIG. 14 is a flowchart of container execution platform reconstruction processing according to the embodiment.

FIG. 14 is a flowchart of the container execution platform reconstruction processing according to the embodiment.

The container execution platform reconstruction processing is executed when the administrator of the container orchestration program P20 wants to reconstruct the container execution platform by reusing a volume that is previously used.

When the storage information acquisition and setting program P40 is provided, it receives an instruction from the administrator of the container orchestration program P20 to make the previously used volume available for use (S410).

Next, the storage information acquisition and setting program P40 acquires information on the correspondence between each container application and a volume from the container app-volume correspondence table T40 of the storage server 40 (S420).

Next, the storage information acquisition and setting program P40 requests the storage driver container P30 to create a volume for a container that is associated with an existing volume based on the acquired information on the correspondence between the container application and the volume, and the storage driver container P30 creates the requested volume for the container (S430).

This container execution platform reconstruction processing makes it possible to associate the volume used by the container application in the container execution platform with the volume in the pool that is previously used.

Next, container remote copy processing for migrating the application program container P10 running on a certain site 10 (migration source site) to another predetermined site 10 (migration destination site) will be described.

Figure 15:
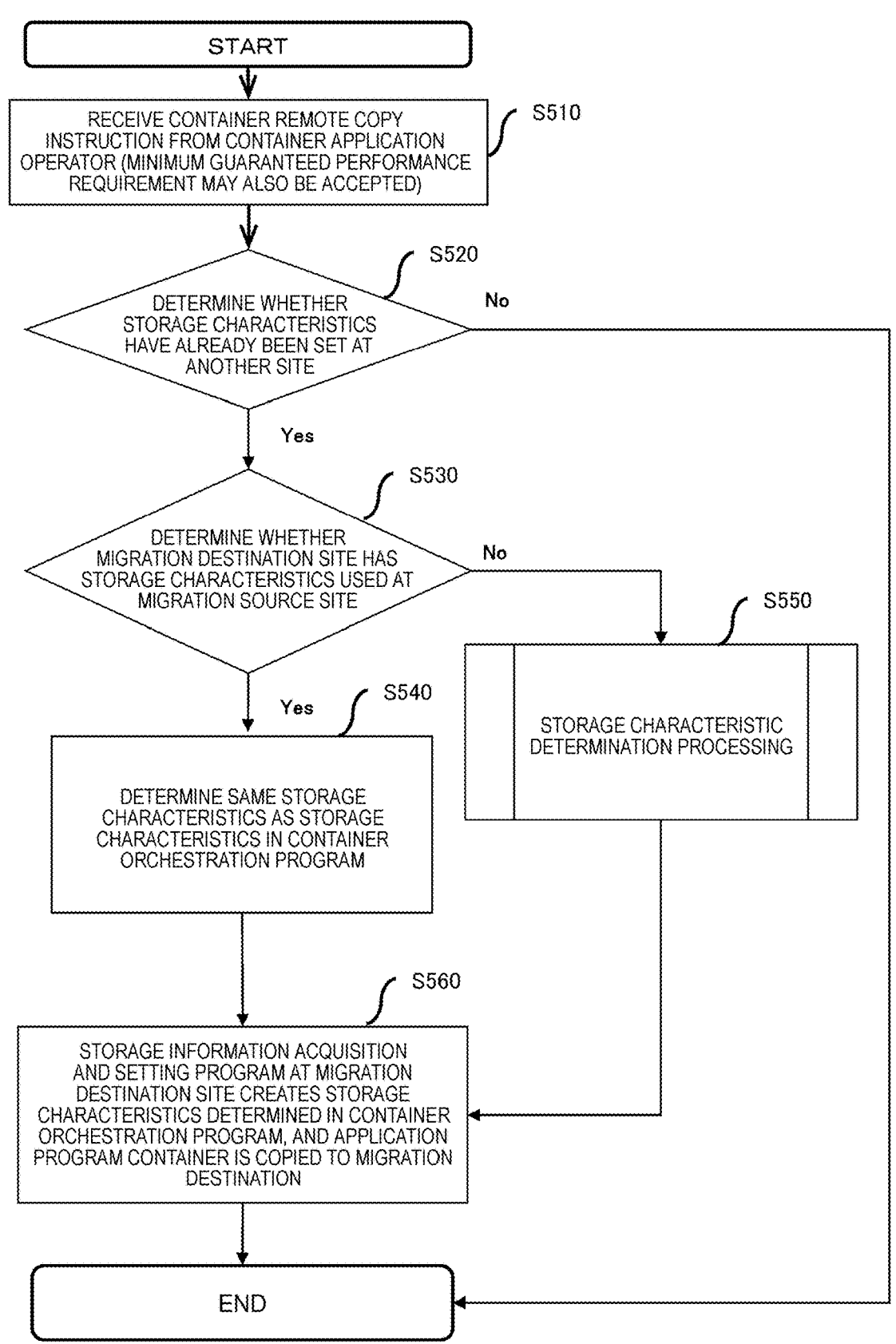
FIG. 15 is a flowchart of container remote copy processing according to the embodiment.

FIG. 15 is a flowchart of the container remote copy processing according to the embodiment.

The storage management program P70 receives a container remote copy instruction from an operator of the container application (S510). Here, the storage management program P70 may also receive a minimum performance requirement (minimum guaranteed performance requirement) that should be guaranteed for the pool used by the container.

Next, the storage management program P70 determines whether the storage characteristics have already been set at the migration destination site 10 (S520). As a result, when the storage characteristics have not yet been set (S520: No), the storage management program P70 terminates the processing.

On the other hand, when the storage characteristics have already been set (S520: Yes), the storage management program P70 determines whether the migration destination site has the same storage characteristics as the pool used by the container at the migration source site (S530).

As a result, when the migration destination site has the same storage characteristics as the pool used by the container at the migration source site (S530: Yes), the storage management program P70 determines the same storage characteristics as the storage characteristics in the container orchestration program P20 at the migration destination site, notifies the storage information acquisition and setting program P40 at the migration destination site (S540) of the determination, and proceeds to step S560.

On the other hand, when the same storage characteristics are not found (S530: No), the storage management program P70 executes storage characteristic determination processing (see FIG. 16) to determine the storage characteristics that are closest to the storage characteristics of the migration source site (S550), and proceeds to step S560.

In step S560, the storage information acquisition and setting program P40 of the migration destination site creates (sets) the storage characteristics notified from the container orchestration program P20, and the container orchestration program P20 copies the application program container P10 of the migration source site and terminates the processing.

This container remote copy processing makes it possible to easily and appropriately create the storage characteristics used by the container at the migration destination site in the migration destination container orchestration program P20, and allows the application program container P10 to be executed at the migration destination site without changing the settings related to the storage characteristics.

Next, the storage characteristic determination processing in step S550 will be described.

Figure 16:
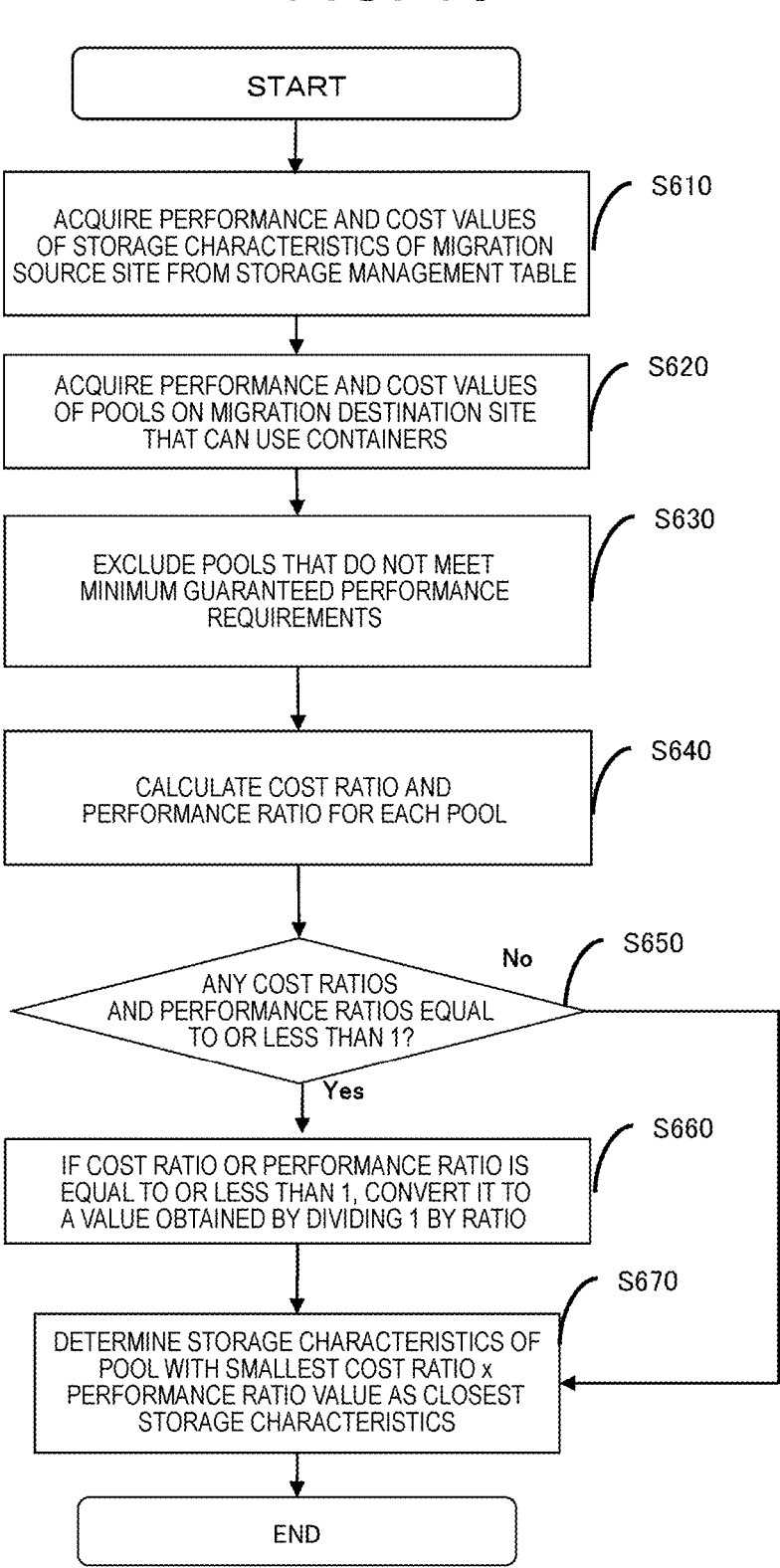
FIG. 16 is a flowchart of storage characteristic determination processing according to the embodiment.

FIG. 16 is a flowchart of the storage characteristic determination processing according to the embodiment.

The storage management program P70 acquires values of the performance and cost of the storage characteristics of the migration source site from the storage management table T30 (S610).

Next, the storage management program P70 specifies pools at the migration destination site that can use containers from the storage management table T30 as candidates for the migration destination pool, and acquires values of the performance and cost of the specified candidate pools (S620).

When the storage management program P70 has received an instruction for minimum guaranteed performance requirements in step S510, it excludes from the specified pools those that do not meet the minimum guaranteed performance requirements from among the pool candidates (S630). This makes it possible to prevent pools that do not meet the minimum guaranteed performance requirements from becoming migration destination pools.

Next, the storage management program P70 calculates a cost ratio and a performance ratio for the migration destination pool candidate (S640). Here, cost ratio=cost of storage characteristics of migration source site/cost of storage characteristics of migration destination site, and performance ratio=performance of storage characteristics of migration source site/performance of storage characteristics of migration destination site.

Next, the storage management program P70 determines whether there are any migration destination pool candidates with cost ratios and performance ratios that are 1 or less (S650).

As a result, when any of the cost ratios and performance ratios are less than 1 (S650: Yes), the storage management program P70 converts the cost ratios and performance ratios that are less than 1 to values obtained by dividing 1 by those values (S660), and proceeds to step S670.

On the other hand, when there is no cost ratio and performance ratio that is equal to or less than 1 (S650: No), the storage management program P70 advances the processing to step S670.

In step S670, the storage management program P70 calculates the cost ratio x performance ratio for each pool candidate, and sets the pool with the smallest value as the pool with storage characteristics closest to the storage characteristics of the migration source pool, and determines the storage characteristics of this pool as the storage characteristics for the corresponding pool in the migration destination container orchestration program P20.

According to this storage characteristic determination processing, it is possible to determine the storage characteristics close to the storage characteristics of the migration source pool as the storage characteristics to be created in the container orchestration program P20.

The present invention is not limited to the above-described embodiment, and can be modified as appropriate without departing from the spirit of the present invention.

For example, in the above-described embodiment, some or all of the processing performed by the CPU may be performed by a hardware circuit. Furthermore, the programs in the above-described embodiment may be provided from a program source. The program source may be a program distribution server or a recording medium (for example, a portable recording medium).

What is claimed is:

1. A computer system with clouds of a plurality of bases and a management server, wherein
the cloud includes a compute server on which a container execution platform for executing a container is built, and a storage server that provides a storage area for storing data,
the management server stores a storage characteristic of a storage area of a storage server in the cloud of each base and connection information to the storage area,
the compute server,
acquires, from the management server, a storage characteristic and connection information of the storage area in the base to which the compute server belongs,
determines a storage area to be allocated to the container of the container execution platform based on the storage characteristic, and allocates the determined storage area to the container based on the connection information, and the management server, determines, when the container is migrated from the cloud of a base of a migration source to the cloud of a base of a migration destination different from the migration source, whether a storage area having a same storage characteristic as a storage area used by the container at the base of the migration source exists in the cloud at the base of the migration destination, sets, when a storage area having the same storage characteristic exists, the existing storage area with the storage characteristic in the container execution platform of the cloud of the migration destination, and specifies, when a storage area having the same storage characteristic does not exist, a storage area having a storage characteristic similar to that of the storage area used by the container, based on a performance ratio between performance of the storage area at the base of the migration source and performance of the storage area at the base of the migration destination, and a cost ratio between cost of the storage area at the base of the migration source and cost of the storage area at the base of the migration destination.

2. The computer system according to claim 1, wherein the connection information includes information on a connection destination for connecting to the storage server that provides the storage area, and an account and password to be used when connecting to the storage server.

3. A computer system with clouds of a plurality of bases and a management server, wherein the cloud includes a compute server on which a container execution platform for executing a container is built, and a storage server that provides a storage area for storing data, the management server stores a storage characteristic of a storage area of a storage server in the cloud of each base and connection information to the storage area, the compute server, acquires, from the management server, a storage characteristic and connection information of the storage area in the base to which the compute server belongs, determines a storage area to be allocated to the container of the container execution platform based on the storage characteristic, and allocates the determined storage area to the container based on the connection information, the management server or the storage server stores information on a volume of the storage server that is used by an application in a previously existing container, and the compute server allocates the volume used by the storage server to an application of a container to be reconstructed based on the information on the volume.

4. The computer system according to claim 1, wherein the management server, stores a storage area that is prohibited from use, and the management server, specifies, when a storage area having the same storage characteristic does not exist, a storage area having a storage characteristic similar to that of the storage area used by the container from among storage areas of which use is not prohibited.

5. The computer system according to claim 1, wherein the management server, receives a minimum guaranteed performance requirement, and specifies, when a storage area having the same storage characteristic does not exist, a storage area having a storage characteristic similar to that of the storage area used by the container from among storage areas that satisfy the performance requirement.

6. A storage management method for a computer system with clouds of a plurality of bases and a management server, wherein the cloud includes a compute server on which a container execution platform for executing a container is built, and a storage server that provides a storage area for storing data, the management server stores a storage characteristic of a storage area of a storage server in the cloud of each base and connection information to the storage area, the compute server, acquires, from the management server, a storage characteristic and connection information of the storage area in the base to which the compute server belongs, determines a storage area to be allocated to the container of the container execution platform based on the storage characteristic, and allocates the determined storage area to the container based on the connection information, and the management server, determines, when the container is migrated from the cloud of a base of a migration source to the cloud of a base of a migration destination different from the migration source, whether a storage area having a same storage characteristic as a storage area used by the container at the base of the migration source exists in the cloud at the base of the migration destination, sets, when a storage area having the same storage characteristic exists, the existing storage area with the storage characteristic in the container execution platform of the cloud of the migration destination, and specifies, when a storage area having the same storage characteristic does not exist, a storage area having a storage characteristic similar to that of the storage area used by the container, based on a performance ratio between performance of the storage area at the base of the migration source and performance of the storage area at the base of the migration destination, and a cost ratio between cost of the storage area at the base of the migration source and cost of the storage area at the base of the migration destination.

7. A storage management method for a computer system with clouds of a plurality of bases and a management server, wherein the cloud includes a compute server on which a container execution platform for executing a container is built, and a storage server that provides a storage area for storing data, the management server stores a storage characteristic of a storage area of a storage server in the cloud of each base and connection information to the storage area, the compute server, acquires, from the management server, a storage characteristic and connection information of the storage area in the base to which the compute server belongs, determines a storage area to be allocated to the container of the container execution platform based on the storage characteristic, and allocates the determined storage area to the container based on the connection information, the management server or the storage server stores information on a volume of the storage server that is used by an application in a previously existing container, and the compute server allocates the volume used by the storage server to an application of a container to be reconstructed based on the information on the volume.

\* \* \* \* \*